(12) United States Patent
Haiges

(10) Patent No.: US 11,528,889 B2
(45) Date of Patent: Dec. 20, 2022

(54) ANIMAL CARE AND/OR CLEANING DEVICE

(71) Applicant: SUEVIA HAIGES GMBH, Kirchheim/Neckar (DE)

(72) Inventor: Frank Haiges, Kirchheim/Neckar (DE)

(73) Assignee: SUEVIA HAIGES GMBH, Kirchheim/Neckar (DE)

( * ) Notice: Subject to any disclaimer, the term of this patent is extended or adjusted under 35 U.S.C. 154(b) by 386 days.

(21) Appl. No.: 16/764,946

(22) PCT Filed: Nov. 9, 2018

(86) PCT No.: PCT/EP2018/080813
§ 371 (c)(1),
(2) Date: May 18, 2020

(87) PCT Pub. No.: WO2019/096706
PCT Pub. Date: May 23, 2019

(65) Prior Publication Data
US 2020/0344977 A1    Nov. 5, 2020

(30) Foreign Application Priority Data

Nov. 20, 2017   (DE) .................... 10 2017 010 781.5

(51) Int. Cl.
*A01K 13/00*   (2006.01)
*A46B 13/00*   (2006.01)

(52) U.S. Cl.
CPC .......... *A01K 13/001* (2013.01); *A46B 13/008* (2013.01); *A46B 2200/10* (2013.01)

(58) Field of Classification Search
CPC .... A01K 13/001; A01K 13/00; A01K 13/004; A46B 13/008; A46B 2200/10;
(Continued)

(56) References Cited

U.S. PATENT DOCUMENTS

| 10,952,527 B2 * | 3/2021 | Ruiz Rodriguez .. A46B 13/001 |
| 2015/0136039 A1 | 5/2015 | Van Der Poel |
| 2021/0000076 A1 * | 1/2021 | Munneke ............... A01K 13/00 |

FOREIGN PATENT DOCUMENTS

| DE | 100 02 688 | 2/2002 |
| EP | 2 359 684 | 8/2011 |

(Continued)

OTHER PUBLICATIONS

International Search Report (ISR) dated Jan. 21, 2019 in International (PCT) Application No. PCT/EP2018/080813.

*Primary Examiner* — David J Walczak
(74) *Attorney, Agent, or Firm* — Wenderoth, Lind & Ponack, L.L.P.

(57) ABSTRACT

An animal care or cleaning device has a brush (2) mounted on a brush shaft (16), drivable by an electric motor drive (36) to rotate the brush (2). The brush shaft is rotatably mounted in a bearing (14) provided on a support (4, 6), and has an actuator by which the drive (36) can be actuated as a function of contact of the brush (2) with an animal body. The bearing (14) has at least one shaft bearing (14) that holds the axis of rotation of the brush (2) in a fixed positional relationship to the support (4, 6). The drive (36) is driven by torque acting on the brush shaft (16) in one or other direction of rotation, caused by an impact motion of the animal body on the brush (2), and is carried along at most to a predeterminable dead stop on the support (4, 6). The drive triggers the actuator (42) for actuating the drive (36) during this motion.

21 Claims, 4 Drawing Sheets

(58) Field of Classification Search
CPC ....... A46B 13/00; A46B 13/001; A46B 13/02; A46B 13/023; A46B 13/026
See application file for complete search history.

(56) References Cited

FOREIGN PATENT DOCUMENTS

EP         2 852 279        6/2016
WO       2009/131439      10/2009

* cited by examiner

ANIMAL CARE AND/OR CLEANING DEVICE

FIELD OF THE INVENTION

The invention relates to an animal care and/or cleaning device, having at least one brush, which is attached to a shaft of the brush. The brush can be driven by an electromotive drive to produce a rotary motion of the brush and is rotatably mounted in a bearing device provided on a support device. An actuating device can be used to actuate the drive as a function of contact of the brush with an animal body.

BACKGROUND OF THE INVENTION

Devices of this type, which are used in particular for cleaning cattle, are state of the art. Document EP 2 359 684 A2, for instance, discloses a device of this type, in which the bearing device of the brush body is movably guided in a cantilever arm constituting a component of the support device and can be displaced against a spring force by an animal body pressing against the brush body in the cantilever arm. A position detector is provided as the actuating device for the drive, which position detector detects a displacement motion of the bearing device in the cantilever arm and triggers drive control. Document DE 100 02 688 C2 discloses a device of the same type, in which the drive and the bearing device for the shaft of the brush of two brushes are supported on a parallelogram-shaped frame structure, which forms part of the support device and which can be moved against spring force relative to a supporting structure by contact with an animal body. The actuating device for the drive has a contact element, electric contact with which can be applied by this relative motion.

SUMMARY OF THE INVENTION

Based on this state of the art, the invention addresses the problem of providing a device of the type mentioned at the outset, which is characterized by a very effective cleaning action and a simple and robust design.

According to the invention, this task is basically solved by an animal care and/or cleaning device having, as an essential special feature of the invention, a bearing device having at least one shaft bearing holding the axis of rotation of the brush in a fixed positional relationship to the support device. Also, the drive is entrained by a torque acting on the shaft of the brush in one or the other direction of rotation, caused by an impact motion of the animal body on the brush, at most up to a predeterminable dead stop on the support device. The drive triggers the actuating device for the purpose of actuating the drive during this motion. The drive can be switched on almost instantaneously as soon as it is entrained by the shaft friction caused by the impact motion of the brush.

The fact that, according to the invention, the axis of rotation of the at least one brush is held in a fixed positional relationship to the support device by the bearing device and that the relevant brush then does not perform any yielding deflection motion or evasion motion when loaded by an animal body means that an efficient cleaning action can be achieved, for instance in comparison to supporting the relevant shaft of the brush using spring force, as is the case with the above-mentioned solutions of the prior art. At the same time, the absence of articulated joints for the movable suspension of the bearing device, which exist in those known solutions, makes for a particularly simple and cost-effective design in a robust construction, which is particularly reliable for use in the area of stabling for livestock. Whereas in the prior art the yielding deflection motions or evasion motions caused by contact with an animal body can be detected by proximity switches, inclination sensors or the like forming the actuating device, the drive according to the invention can be rotated and entrained to a relevant dead stop in the event of a torque caused by contact with an animal body at the shaft of the brush, so that a detectable relative rotation is available for triggering the actuating device.

The arrangement can be made with particular advantage such that the torque on the shaft of the brush caused by the impact motion of the animal body against the brush is at least partially passed on to the transmission or the output shaft of the drive by friction or blocking. The torque then entrains the housing of the drive at most up to its dead stop position at the predeterminable dead stop of the support device. For safe torque transmission based on blocking or friction, the drive can advantageously have a self-locking worm gear or a conventional geared motor having inherent friction.

With regard to the design of the actuating device, the arrangement can advantageously be such that the actuating device has a switch, preferably in the form of a proximity switch, particularly preferably in the form of a vibration switch, or a sensor.

The actuating device may advantageously be arranged on the drive and/or on the support device.

In advantageous exemplary embodiments, the support device has an anchoring part, which can be attached to a supporting structure, such as a building wall, and has struts extending downwards therefrom at an angle of preferably 45°, to the ends of which the bearing support of the shaft bearing is attached.

Advantageously the bearing support can have a U section beam support, whose tie bar extending between its U legs and penetrated by the shaft of the brush, forms a plane. The plane is inclined to the vertical in such a way that the shaft of the brush penetrating the tie bar at right angles has the same inclination to the vertical as the struts.

In this case, the shaft bearing can be arranged on the tie bar of the U section beam in such a way that the shaft of the brush runs or extends between the struts and in parallel thereto. The end of the shaft of the brush is supported as the output shaft of an electric geared motor in the transmission of the motor.

In particularly preferred exemplary embodiments, the brush as the bristle support has a circular disk, which is connected to the assigned end of the shaft of the brush.

It may be advantageous to arrange the brush in such a way that the length of the U section beam is greater than the diameter of the circular disk and such that at its ends the U section beam forms attachment points for an annular body protruding beyond these disks. The annular body extends along the circumference of the circular disk at a distance therefrom. In this arrangement, the ring body forms a kind of cover, which protects the bristle-free area of the brush body formed by the rotating circular disk against contact. If the device according to the invention is intended for use in calf pens, the large overall length of the U section beam, which protrudes beyond the circular disk, and an annular body surrounding the circular disk as impact protection can be omitted.

In the case of particularly advantageous exemplary embodiments, which are characterized by a particularly good cleaning effect, the brush with its bristles forms a bristle body in the form of a truncated cone. The cone, starting from the circular disk, widens conically at an angle of 25° and ends in a plane parallel to the circular disk.

Advantageously, the height of the cone is equal to or preferably smaller than half the diameter of the circular disk.

Advantageously, the cone has an interior coaxial with the shaft of the brush and free of bristles, and a second bristle body is arranged in the interior. The bristles of the second bristle body project out of the plane formed by the free ends of the bristles of the cone forming the first bristle body. In this configuration, the wiping area of the brush adapts in a favorable manner to any irregular contours of animal bodies concerned.

With advantage, the second bristle body may be of essentially circular cylinder shape, wherein bristles of a type different from the first bristle body may be provided for the second bristle body.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
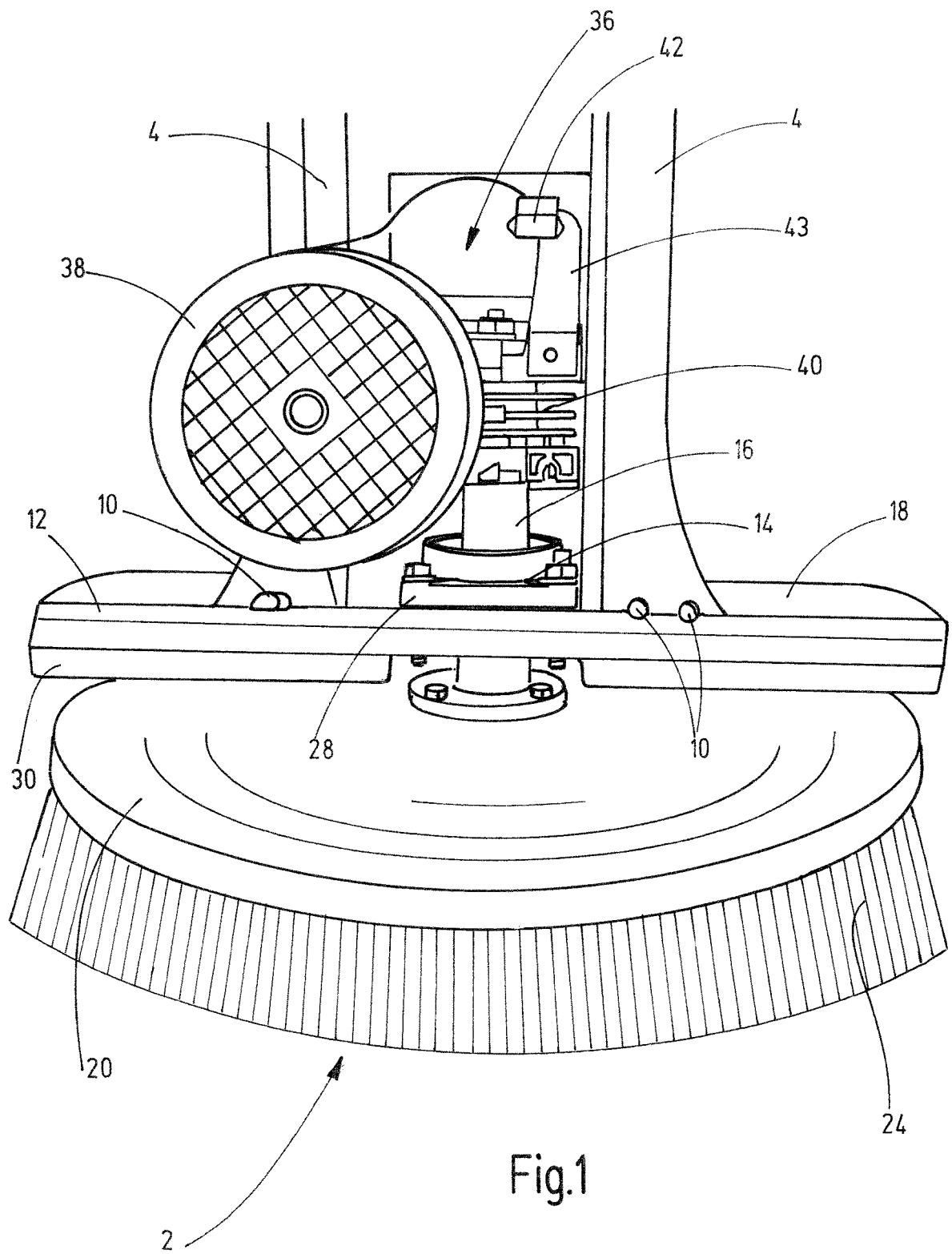
FIG. 1 is a perspective view of a device according to a first exemplary embodiment of the invention, wherein struts forming part of the assigned support device are shown broken off.
Figure 3:
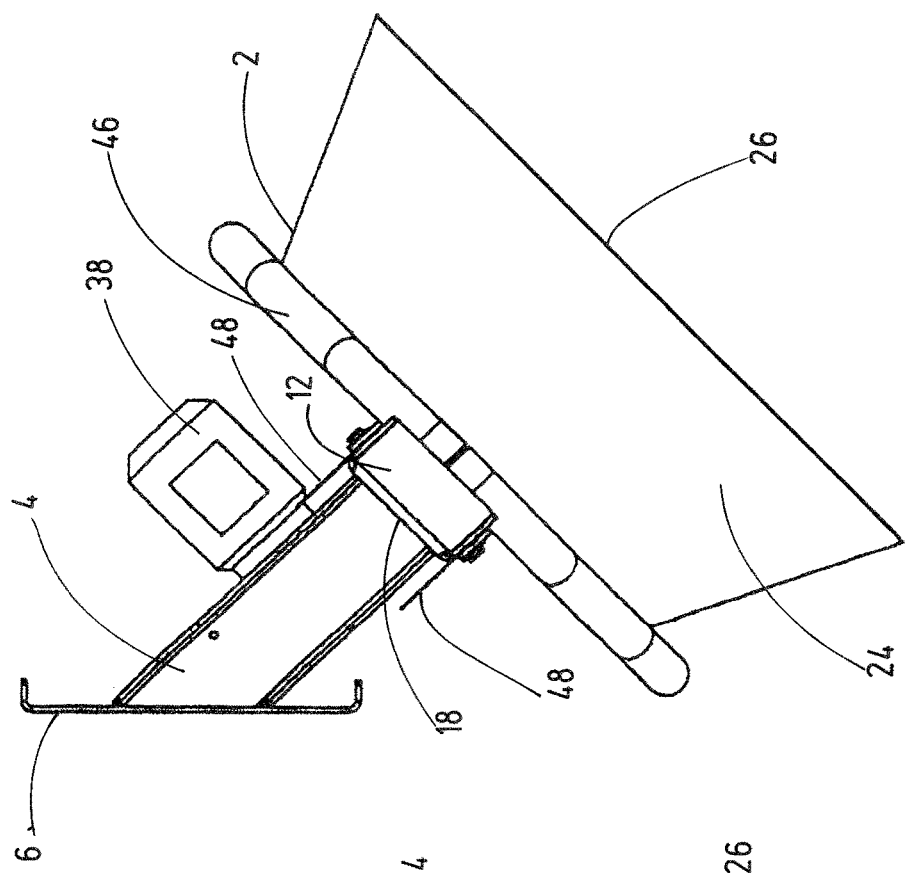
FIG. 3 is a side view of the device of the second exemplary embodiment of FIG. 2.
Figure 2:
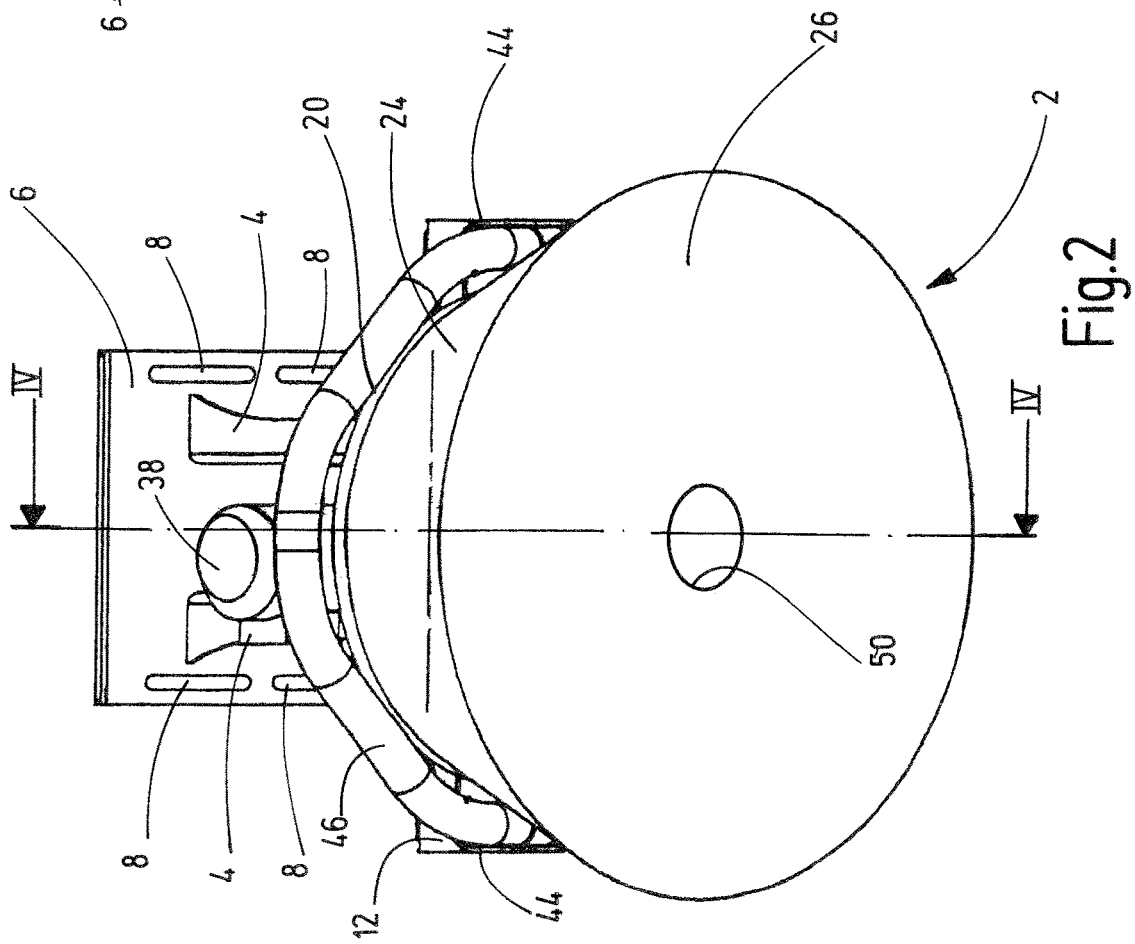
FIG. 2 is a front view of a device according to a second exemplary embodiment of the invention that is slightly different from FIG. 1.
Figure 4:
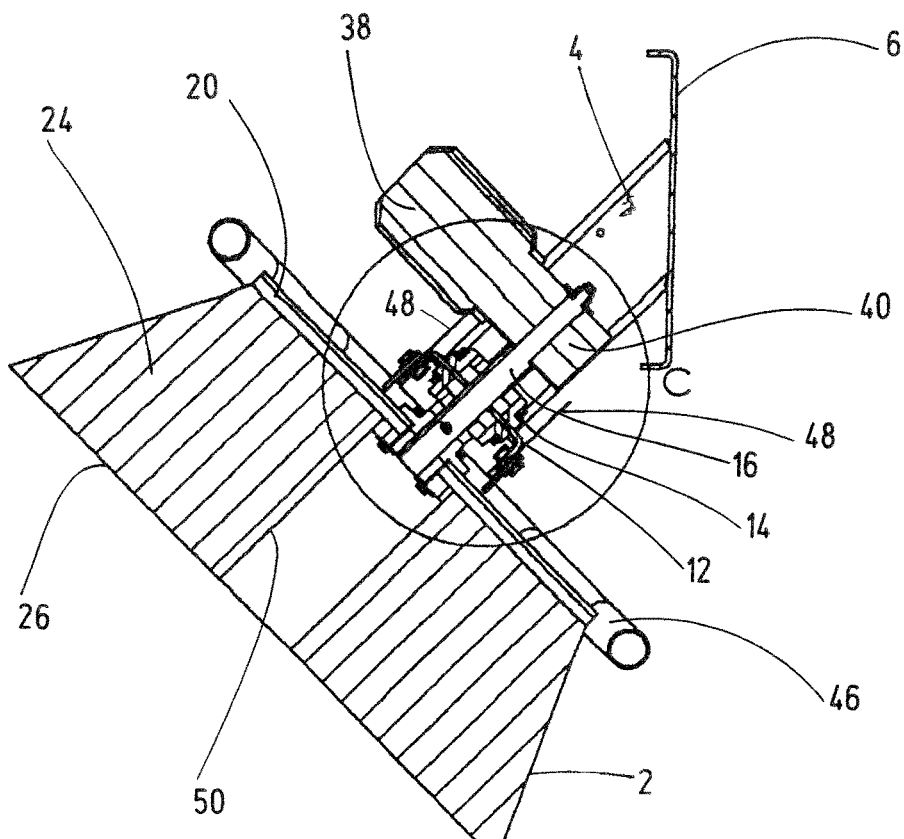
FIG. 4 is a side view in section of the device of the second exemplary embodiment, corresponding to the section plane indicated in FIG. 2 by IV-IV.

FIG. 1 shows only the end section of struts 4 of a support device that forms the support for a brush 2, which struts are attached to an anchoring part 6 by welding, which is shown in FIGS. 2 to 4. The anchoring part 6 has the shape of a square metal plate provided with slots 8 for retaining bolts, which are used to attach the anchoring part 6 to a supporting structure, such as the wall of a stabling for livestock. The struts 4 are fastened in such a way that they, see FIGS. 3 and 4, extend downwards at an angle of 45° to the plane of the anchoring part 6. The lower ends of the struts 4 are connected to a U section beam 12 at welding points 10 (FIG. 1), which beam forms the bearing support for a shaft bearing 14, in which the brush 2 with its shaft is supported. In accordance with the inclination of the struts 4, the plane formed by the tie bar 18 of the U section beam 12 has an inclination of 45° to the vertical, such that the shaft 16 of the brush 2 has the same inclination of 45°. The shaft bearing 14 of brush 2 is attached to the tie bar 18 and extends through the tie bar 18 at right angles.

Figure 6:
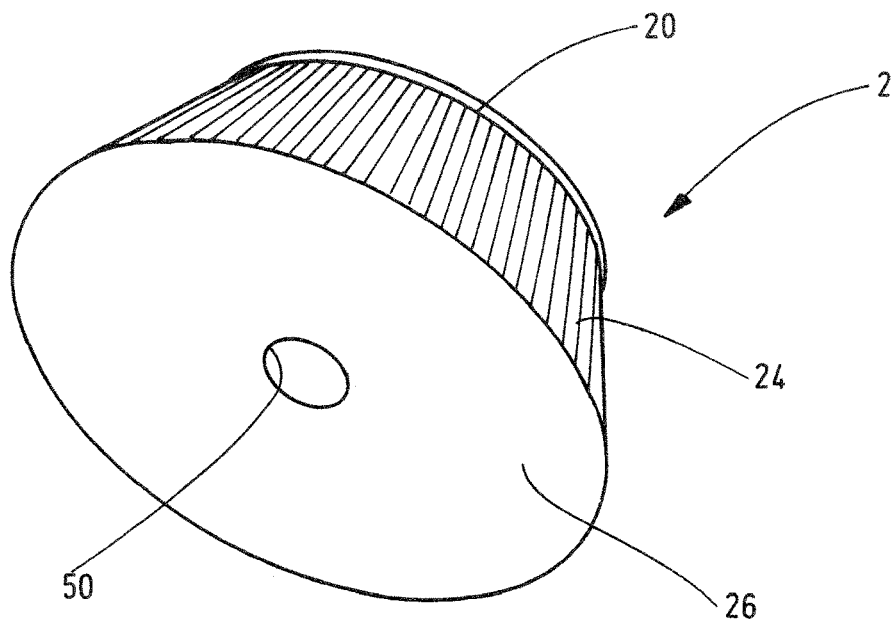
FIGS. 6 and 7 are a perspective view and a side view in section, respectively, of the separately shown brush.
Figure 7:
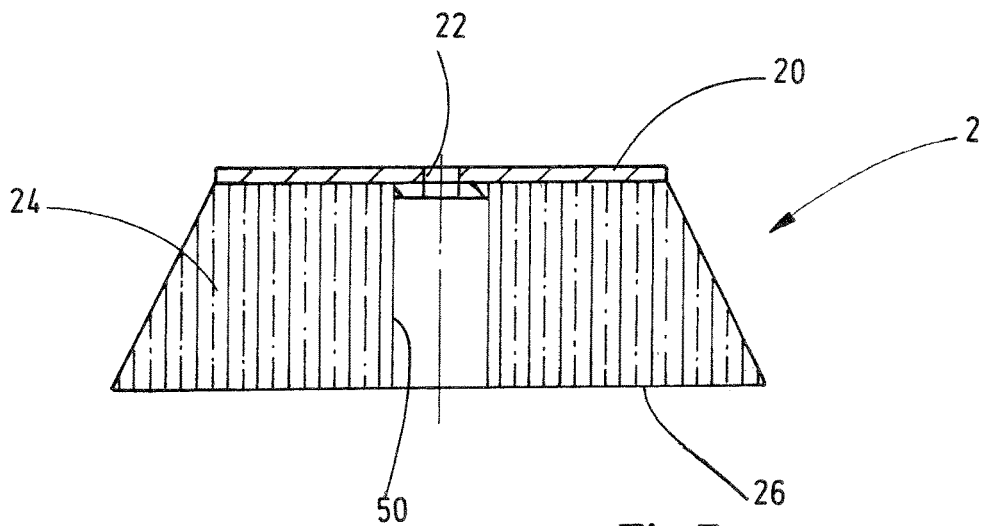

The free, lower end of the shaft of the brush shaft 16 is connected to the bristle support of brush 2. As FIGS. 6 and 7 show, in which the brush 2 is shown separately, the bristle support is formed by a circular disk 20 made of plastic. Circular disk 20 has a central bore 22 penetrated by the shaft 16 of the brush 2 and is attached to a bristle body in the form of a truncated cone 24. The truncated cone 24 is formed by nylon bristles, which in the present example have a diameter of 2.5 mm. As can be seen most clearly in FIG. 7, the truncated cone 24, starting from the circular disk 20, has an opening angle of 25° in the example shown. The bristles end in a plane 26 parallel to the circular disk 20. The height of the cone 24 forming the bristle body is slightly smaller than the diameter of the circular disk 20 forming the bristle support.

Figure 5:
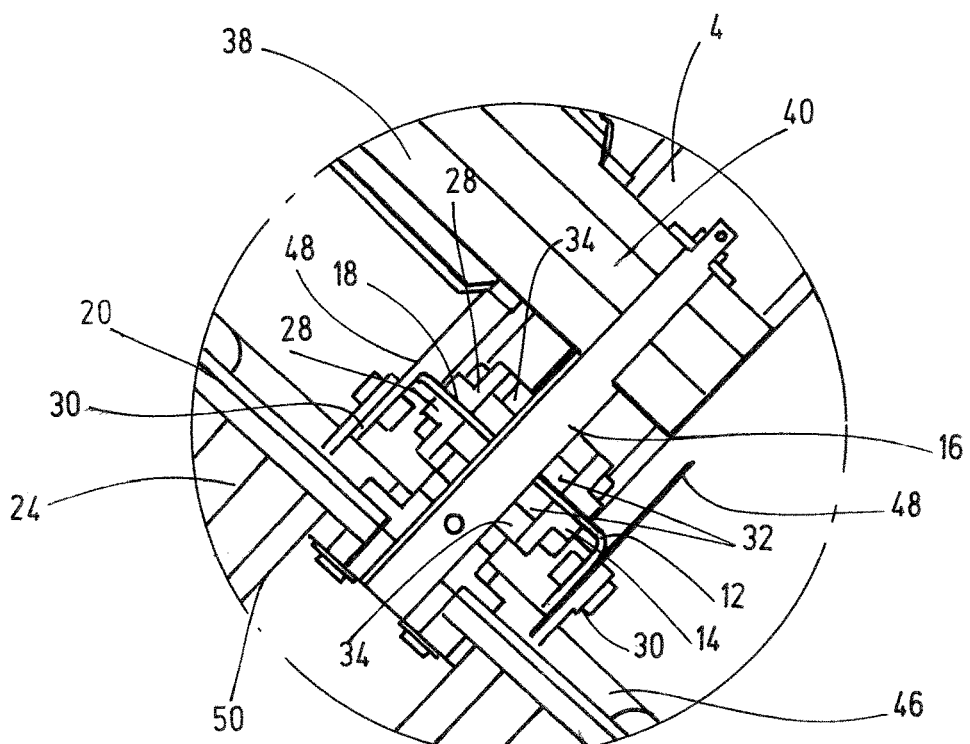
FIG. 5 is an enlarged partial section of the area shown in FIG. 4 designated by V-V.

As FIG. 1 and most clearly FIG. 5 show, the shaft bearing 14 as bearing support has flange rings 28, which are bolted to the tie bar 18 extending between section legs 30 of the U section beam 12. The flange rings 28 form the holder of a roller bearing unit 32. It supports the shaft 16 of the brush 2 in such a way that shaft 16 extends in parallel to the struts 4 in the space therebetween. The drive 36 has an electric motor 38 having a reduction gear 40 flanged thereto, which in the present example is formed by a worm gear. The e brush shaft 16 is supported in the housing of the transmission 40 and forms the output shaft of the transmission 40. When a rotational motion is triggered by a contact of the brush 2 and an animal body, the torque acting on the shaft of the brush 16 in one or the other direction of rotation is transmitted to the transmission 40 because the self-locking effect of the worm gear, thereby entraining the drive 36 in the rotational motion. As FIGS. 1, 4 and 5 show, the transmission 40 and the adjacent part of the electric motor 38 are located in the space between the struts. The brush shaft 16 extends between the struts 4. During the entrained rotational motion of the transmission 40, when the brush 2 is twisted by an animal body, the struts 4 each form a dead stop limiting the rotational motion of twisting in one or the other direction. This rotational motion can be detected for triggering the actuating device for drive control, for instance by a proximity switch or the like. In the exemplary embodiment shown, for this purpose a vibration switch 42 is provided. The vibration switch 42 is mechanically coupled to the housing of the transmission 40 via a carrier 43 and detects generated vibrations at the latest when striking one of the struts 4 and transmits a switching pulse to an electronic circuit (not shown). As a rule, however, the impact motion by the animal body as such is sufficient for a slight motion of the drive to trigger the vibration switch and switch the motor 38 for driving the brush 2 on. In this respect, the dead stop of the motor housing on the struts 4 only serves to ensure that the motor 38 does not continue to move unintentionally.

The exemplary embodiment of FIGS. 2 to 5, slightly modified compared to FIG. 1, an annular body 46, composed of round tube sections, is connected at the ends 44 (FIG. 2) of the U section beam 12, which ends 44 project outwards beyond the diameter of the circular disk 20. This structure forms a kind of cover and protection against contact with the rotating, bristle-free circular disk 20 of the brush 2. Furthermore, see FIGS. 4 and 5, a plastic sleeve 48 is attached to the lateral legs 30 of the U section beam 12, which encompasses the shaft of the brush 16, covers the free space between the struts 4 in the area between the transmission 40 and the U section beam 12 and is not shown in FIG. 1.

Figure 8:
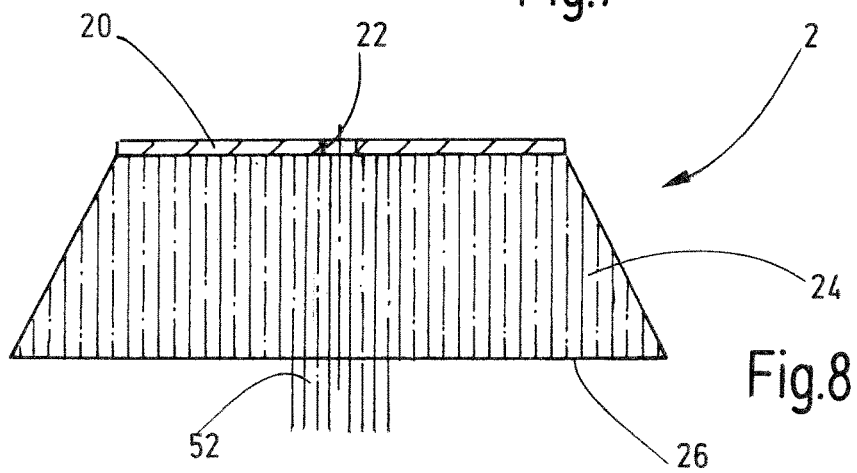
FIG. 8 is a side view in section of a modified version of the brush shown separately.

As FIGS. 2 and 4 to 7 show, the truncated cone 24 forming the bristle body has an interior 50 starting from the circular disk 20 and coaxial to the brush shaft 16, which interior is free from bristles. In a modified version of the brush 2 shown in FIG. 8, the interior 50 of the cone 24 forming the bristle body contains a second bristle body 52, which is essentially shaped like a circular cylinder. The bristles of the second bristle body 52 project beyond the plane 26 formed by the ends of the truncated cone 24. The bristles of the second bristle body 52 may be of the same design as the bristles of the truncated cone 24 forming the first bristle body, but may also have a different bristle diameter or be composed of a different plastic material. Preferably, the axial projection of the bristles of the second bristle body 52 above the plane 26 is not more than half the axial height of the cone 24 of the first bristle body.

In partial agreement with the solution according to DE 100 02 688 C2, in a modified version (not shown in more detail), a second brush, whose axis of rotation is arranged horizontally, may be coupled in a drivable manner to a brush via an angular gear, The axis of rotation of the second brush is vertical and, in turn, interacts with the actuating device according to the invention, as described above. Both brushes are then mounted on a parallelogram linkage or a frame structure such that they can be driven by an animal body, in order to permit adaptation to different animal sizes.

While various embodiments have been chosen to illustrate the invention, it will be understood by those skilled in the art that various changes and modifications can be made therein without departing from the scope of the invention as defined in the claims.

The invention claimed is:

1. An animal care or cleaning device, comprising:
a rotatable brush;
a brush shaft coupled to a drive capable of being driven by an electric motor and generating a rotary motion of the rotatable brush, the brush shaft being rotatably mounted in a bearing on a support, the bearing including a shaft bearing holding an axis of rotation of the rotatable brush in a fixed positional relationship relative to the to the support; and
an actuator actuating the drive as a function of contact of the rotatable brush with an animal body, the drive being driven by torque acting on the brush shaft in a first direction of rotation or a second direction of rotation caused by an impact motion of the animal body on the rotatable brush carried along at most to a predeterminable dead stop on the support, the drive triggering the actuator actuating the drive during the impact motion.

2. The animal care or cleaning device according to claim 1 wherein
the torque on the brush shaft caused by the impact motion of the animal body against the rotatable brush is at least partially passed on to a transmission or an output shaft of the drive by friction or blocking, such that the torque entrains a housing of the drive at most up to a dead stop position thereof at the predeterminable dead stop of the support.

3. The animal care or cleaning device according to claim 1 wherein
the drive is a self-locking worm gear or a conventional gear motor having inherent friction.

4. The animal care or cleaning device according to claim 1 wherein
the actuator comprises a switch.

5. The animal care or cleaning device according to claim 4 wherein
the switch is a proximity switch.

6. The animal care or cleaning device according to claim 4 wherein
the switch is a vibration switch.

7. The animal care or cleaning device according to claim 1 wherein
the actuator comprises a sensor.

8. The animal care or cleaning device according to claim 1 wherein
the actuating device is arranged on the drive or on the support device.

9. The animal care or cleaning device according to claim 1 wherein
the support has an anchoring part attachable to a supporting structure and has struts extending downwards from the anchoring part at an angle to a vertical, a bearing support of the shaft bearing being attached to ends of the struts.

10. The animal care or cleaning device according to claim 9 wherein
the angle is 45°.

11. The animal care or cleaning device according to claim 9 wherein
the bearing support has a U section beam support with a tie bar extending between U legs of the U section beam support and being penetrated by the brush shaft and forms a plane inclined to the vertical such that the brush shaft penetrates the tie bar at right angles and has a same inclination to the vertical as the struts.

12. The animal care or cleaning device according to claim 11 wherein
the shaft bearing is arranged such that the brush shaft extends between and parallel to the struts, with a first end of the brush shaft supported as the output shaft of an electric geared motor in a transmission of the electric geared motor.

13. The animal care or cleaning device according to claim 12 wherein
the brush has a circular bristle support disk connected to a second end of the brush shaft.

14. The animal care or cleaning device according to claim 11 wherein
a length of the U section beam support is greater than a diameter of the circular bristle support disk; and
ends of the U section beam support are attachment points connected to an annular body protruding beyond the disks, the annular body extending along a circumference of the circular bristle support disk and at a distance from the circular bristle support disk.

15. The animal care or cleaning device according to claim 1 wherein
bristles of the brush form a first bristle body in the form of a truncated cone that widens conically at an angle of 25° starting from a circular bristle support disk and that ends in a plane parallel to the circular bristle support disk.

16. The animal care or cleaning device according to claim 15 wherein
the height of the truncated cone has an axial height equal to or less than half a diameter of the circular bristle support disk.

17. The animal care or cleaning device according to claim 15 wherein the truncated cone has an interior coaxial with the brush shaft and being free of bristles; and a second bristle body is arranged in the interior, bristles of the second bristle body projecting out of the plane formed by free ends of the bristles of the truncated cone forming the first bristle body.

18. The animal care or cleaning device according to claim 17 wherein the second bristle body is consistently essentially of a circular cylinder.

19. An animal care or cleaning device, comprising:

a rotatable brush;

a brush shaft coupled to a drive capable of being driven by an electric motor and generating a rotary motion of the rotatable brush, the brush shaft being rotatably mounted in a bearing on a support, the support having an anchoring part attachable to a supporting structure and having struts extending downwards from the anchoring part at an angle to a vertical, a bearing support of the shaft bearing being attached to ends of the struts, the bearing support having a U section beam support with a tie bar extending between U legs of the U section beam support and being penetrated by the brush shaft and forming a plane inclined to the vertical such that the brush shaft penetrates the tie bar at right angles and has a same inclination to the vertical as the struts; and an actuator actuating the drive as a function of contact of the rotatable brush with an animal body, the drive being driven by torque acting on the brush shaft in a first direction of rotation or a second direction of rotation caused by an impact motion of the animal body on the rotatable brush.

20. The animal care or cleaning device according to claim 19 wherein the shaft bearing is arranged such that the brush shaft extends between and parallel to the struts, with a first end of the brush shaft supported as the output shaft of an electric geared motor in a transmission of the electric geared motor.

21. An animal care or cleaning device, comprising:

a rotatable brush having a circular bristle support disk;

a brush shaft coupled to the circular bristle support disk and to a drive capable of being driven by an electric motor and generating a rotary motion of the rotatable brush, the brush shaft being rotatably mounted in a bearing on a support, the support having an anchoring part attachable to a supporting structure and having struts extending from the anchoring part, a bearing support of the shaft bearing being attached to ends of the struts, the bearing support having a U section beam support with a tie bar extending between U legs of the U section beam support and being penetrated by the brush shaft;

an actuator actuating the drive as a function of contact of the rotatable brush with an animal body, the drive being driven by torque acting on the brush shaft in a first direction of rotation or a second direction of rotation caused by an impact motion of the animal body on the rotatable brush;

a length of the U section beam support being greater than a diameter of the circular bristle support disk; and ends of the U section beam support being attachment points connected to an annular body protruding beyond the disks, the annular body extending along a circumference of the circular bristle support disk and at a distance from the circular bristle support disk.

\* \* \* \* \*